Nov. 24, 1936.  E. ROBERTS  2,061,850

FILTERING ELEMENT AND THE ART OF PRODUCING THE SAME

Filed Jan. 29, 1934

Inventor
Eugene Roberts
by Geo. N. Goddard,
Attorney

Patented Nov. 24, 1936

2,061,850

UNITED STATES PATENT OFFICE 2,061,850

FILTERING ELEMENT AND THE ART OF PRODUCING THE SAME

Eugene Roberts, Hastings, N. Y., assignor to The Western States Machine Company, Salt Lake City, Utah, a corporation of Utah Application January 29, 1934, Serial No. 708,842

4 Claims. (Cl. 210—76)

The filtration of liquids carrying fine particles in suspension, as heretofore practiced commercially whether in centrifugals, filter presses or otherwise, has been attended with considerable loss of the finer particles due to the lack of a thoroughly satisfactory filter screen. Sieves for centrifugals as heretofore made of finely perforated sheets allowed the escape of the finer particles, since heretofore it has not been found commercially practical to punch perforations of a diameter less than .02 inch, or to punch more than about 400 perforations per square inch of sheet. Moreover, sheets perforated to that degree of fineness were so weak and limp that they would stretch unevenly, bulge and crack, thus causing still greater leakage of the particles, besides requiring frequent and costly renewals. The use of fine wire cloth or gauze for filter screens or sieves was also subject to the same troubles and difficulties. Although wire gauze may be made with a fineness of mesh in excess of 100 wires per linear inch providing more than 10,000 openings per square inch, yet fine wire gauze, being more limp even than the perforated sheets commonly used in centrifugals, tends to buckle and bulge and crack under the stresses due to the pressure of liquid even in a filter press and is quickly injured when subjected to the pressure and friction of a clearing scraper or plow.

The present invention overcomes these difficulties and faults by providing a filter element or sieve of any required degree of fineness, which is sufficiently self-supporting to avoid wrinkling, stretching and cracking that has heretofore attended the commercial use of fine sieves and which, therefore, avoids the waste of material due to such imperfections and to the practical limits of fineness of perforation or mesh heretofore experienced.

This application is in part a continuation of my earlier copending application Serial No. 654,043, filed January 28, 1933, which it supersedes.

In general, the invention embraces a composite filter or sieve elements comprising a foraminous filter sheet of any desired degree of fineness integrally united face to face with a relatively stiff, coarsely perforated backing sheet by a film or intervening layer of low fusible metal covering the interforaminal areas of the backing sheet and forming an integral matrix, for the subtending areas of the fine foraminous sieve member, while leaving those areas of the fine sieve that cover the openings in the backing sheet, free for the escape or passage of liquid. This integral face to face union of the delicate sieve member with the backing member positively prevents the stretching, bulging and cracking of the sieve sheet and permits it to readily withstand the pressure and the friction of a cleansing plow or scraper in a way that was impossible with screens or sieves as heretofore constructed and arranged.

The present invention includes not only the novel construction of screen, but also the novel process of producing the same on a scale to meet industrial requirements, the basic feature of which process consists in subjecting to heat and pressure a perforated backing sheet covered by a thin film of fusible metal, such as tin or solder, and a fine foraminous filter sheet, placed in face to face contact therewith, in order to fuse said film and thereby integrate the two sheets throughout their contacting areas. Such integral union between the sheets imparts to the filter sheet the requisite degree of stiffening and support to prevent bulging, stretching and cracking under the stresses to which it is subjected in commercial service, thereby permitting the use of much finer filters, while at the same time greatly prolonging the life and efficiency of the filter sieve. These and other features of the invention will be described in this specification and will be defined in the claims annexed.

In the accompanying drawing I have illustrated, more or less diagrammatically, how commercial production of the composite screen or sieve may be advantageously and economically carried on in accordance with the herein described processes.

In said drawing—

Fig. 1 is a sectional elevation illustrating an arrangement of feeding and pressing rolls in relation to a heating oven adapted for integrally uniting the wire gauze to the backing sheet as the assembled sheets are fed through.

Figure 1:
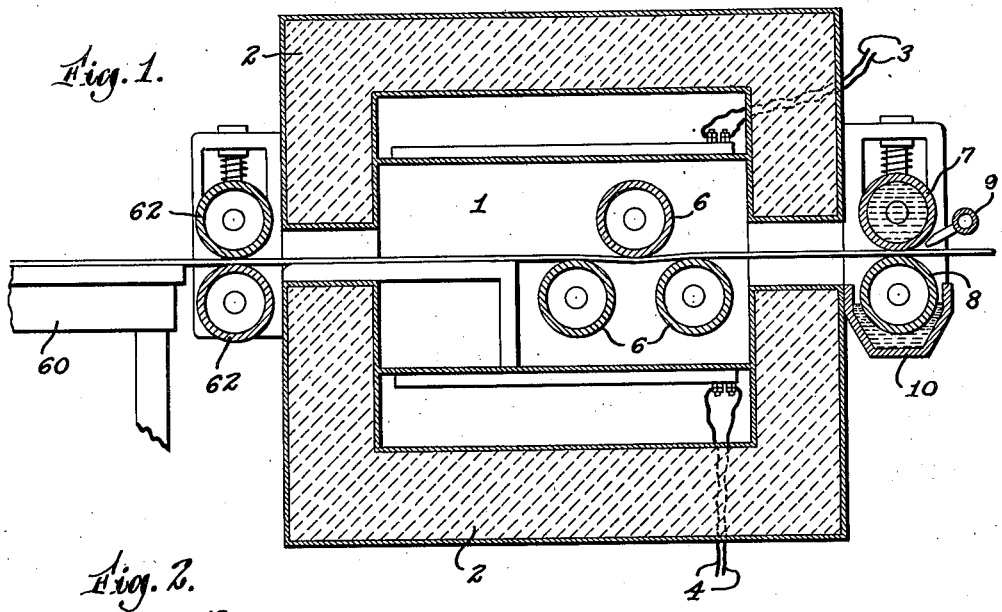
Figure 2:
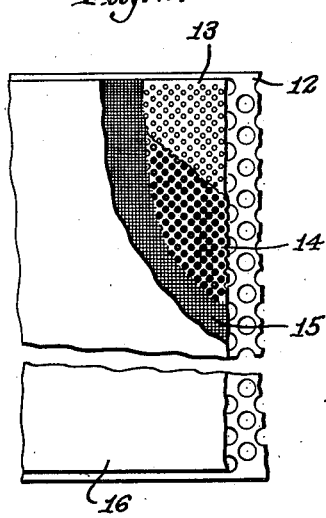
Fig. 2 is a plan view illustrating the assemblage of the sheets on a carrier or drag member preparatory to passing through the oven and between the presser and the cooling rolls.

To produce my improved screen or sieve, a coarsely perforated backing sheet is covered with a thin film of solder composition such, for example, as a tin-lead solder which fuses at between 400° and 500° Fahrenheit. The solder is preferably applied in the form of a very thin perforated sheet, whose perforations are arranged to register with the perforations in the backing sheet and are preferably slightly larger than the perforations in the backing sheet to avoid flowing of the fused solder beyond the edges of the holes in the backing sheet. A sheet of wire gauze of any desired fineness of mesh is then superimposed upon the solder-covered face of the backing sheet and the assembled sheets are then subjected to pressure and to heat sufficient to fuse the solder which, when fused, flows into the interstices of those portions of the wire mesh that are in contact with the imperforate portions of the backing sheet between the perforations or holes and which will be referred to as the interforaminal area of the backing sheet. On cooling, the fused metal or solder will be found to form a binder integrally uniting the interforaminal area of the backing sheet to the subtending area of the wire mesh, which is embedded in the fused metal, while the portions of the wire mesh covering or subtending the perforations in the backing sheet are left open for the escape of liquid. The fused solder thus forms a matrix practically filling all portions of the mesh except those overlying the perforations and permits the lateral flow of any liquid to the screened openings for escape therethrough. To further facilitate the lateral flow of the liquid, the composite screen or sheet may be subjected to a polishing or smoothing action, but this treatment, though advantageous, is not essential to the process.

To facilitate the rapid, large scale and economical production of the novel screen element in accordance with the process of manufacture above described, I have devised a convenient type of apparatus adapted for that purpose and for the sake of illustrating the commercial method of manufacture, such apparatus is diagrammatically illustrated in the drawing, although said apparatus is not claimed herein but forms the subject of a separate application for patent.

In the commercial practice of the invention therefore, I prefer to employ a perforated carrier or drag sheet 12 of sheet metal upon which is laid, first, the perforated backing sheet 13; upon the backing sheet is then laid a thin film or sheet of solder whose thickness will depend somewhat upon the fineness of the mesh (say approximately double the thickness of the wire forming the mesh) and whose perforations correspond with the perforations in the backing sheet, although preferably made somewhat larger in diameter. To maintain registry between the holes in the backing sheet and the holes in the solder film, the forward portion of the solder may be soldered for a short distance along its opposite edges to the backing plate. The sheet of wire mesh or gauze 15 is then laid upon the solder-covered backing sheet. Preferably, to prevent the wire gauze from buckling or springing away from the solder-covered backing sheet, there is placed above it a covering sheet 16 preferably of aluminum which does not adhere to the solder and acts to level the top face of the composite filter sheet.

When the sheets are thus assembled and ready for the soldering operation, they are fed from a supporting table 60 into the nip of feed rolls 2, whence they pass into, and through, an oven 1 located inside a heat-retaining chamber 2. The oven may be heated by any suitable means, such as electric wires 3 and 4, which conduct a heating current to the top and bottom plates of the oven to maintain a regulated and controlled temperature in the oven sufficient to melt the solder, which ordinarily will be a temperature of between 400° and 500° Fahrenheit. In the rear end of the oven is located a train of presser rolls 6 which serve to exert a yielding pressure upon the assembled sheets at the point where the solder has become fused, so that the wire mesh is embedded in the matrix formed by the fused coating of solder carried on the upper face of the perforated backing sheet 13. Behind a narrow transverse outlet of the oven is placed a pair of pressing and cooling rolls 7 and 8. These rolls may be cooled in any suitable manner, such as the circulation of water through the top roll and into a trough 10 which receives the bottom roll. An air blast pipe 9 may also be provided to direct a blast of cold air upon the composite filter sheet as the sheet passes between the cooling and pressing rolls onto the receiving table 11.

Thereafter the composite sheet may be subjected to a leveling or smoothing action, either by passing it between revolving leveling rolls 20, 21, of which the upper roll in contact with the wire mesh face of the sheet travels rather more rapidly than does the lower feed rolls 21, in order to produce a polishing or smoothing effect upon the matrix and its embedded wire mesh, but the leveling and smoothing may be effected by means of a buffing wheel or cylinder 25 provided with fine abrasive.

The perforated backing sheet 13 may be made of any desired or suitable thickness of sheet metal that will suffice to prevent objectionable buckling and make the screen self-sustaining. For example, when making a filter lining for an ordinary sugar centrifugal basket I have made the backing sheet of approximately $\frac{1}{32}$ inch thickness with perforations slightly less than $\frac{1}{4}$ inch diameter, but these dimensions are illustrative and not prescriptive. I have found that such a backing screen, with a #60 or #70 wire mesh, is entirely practicable for use in a sugar centrifugal and is not only self-sustaining but, by reason of the fact that the delicate wire mesh is embedded in the fused metal matrix, it is capable of sustaining the rubbing and scraping of the discharger plow without danger of injury. In filter presses any desired degree of fineness of wire mesh may be used in this manner, while eliminating all buckling, wrinkling or cracking of the wire gauze. The fine particles, that previously escaped through the perforated filter lining of the centrifugal, are now retained, thus eliminating a source of very substantial wastage that has heretofore occurred in the operation of centrifugal filters.

While I have particularly described the process of manufacture in which the soldering film was applied in the form of a separate perforated sheet, and that is considered to be the preferred method, nevertheless it will be understood that instead of interposing a separate thin perforated sheet of solder the binding or uniting film may be provided by dipping the perforated backing sheet into a bath of molten tin or solder, which is allowed to cool before the backing sheet and the sieve sheets are assembled together preparatory to uniting them by heat and pressure in their passage through the heating oven. Indeed, when the filter member consists of a thin sheet of finely perforated metal, the coating or dipping method is usually preferred. By thus providing the sieve member with an integrally united stiffening backing sheet, it is quite practicable to use thinner sheets for the sieve member, even less than 1/64 inch thick and to punch perforations in the sheet as small as .01 inch in diameter, which is sufficiently fine for centrifugal sieves. Indeed, in the case of such centrifugals where discharger plows are used for unloading the sugar, I have found the use of a plow tip of thin steel highly advantageous over the fiber tips heretofore universally used in centrifugal dischargers for such fiber tips required very frequent dressing in order to remove the roughness caused by their rubbing against the filter lining. Not only does this frequent dressing involve loss of production and expense of labor, but the fiber tips always have had a tendency to smear the material over the inside of the filter lining, causing it to become more or less clogged, thus impairing efficiency and requiring frequent washing of the screen. The use of a steel plow tip, instead of the fiber tip that has heretofore been considered indispensable for a successful discharger plow, contributes very greatly to increase the efficiency and economy of centrifugal operation.

It will be understood that to secure the best union between the backing sheet and the filter member both sheets should be rolled as flat and level as possible and should be thoroughly clean in order to promote their intimate union. The method of producing the improved sieve is broadly the same whether the foraminous filter sheet is composed of wire gauze or whether it is composed of finely perforated sheet metal. However, usually the dipping process is preferred when using the finely perforated thin sheet for the filter member, while the separate perforated film of solder is used when making the screen of wire gauze. In the latter case the thickness of the perforated film of solder will vary somewhat according to the fineness of the wire gauze. For example, when the wire gauze is woven of wire having a diameter of .01 of an inch, we prefer to use a solder sheet about .02 inch thick. On finer gauze, in which the wire is, let us say, .006 inch thick, I have used a solder or film sheet approximately .015 inch thick. In general, good results will be secured with the solder sheet or film approximately twice the thickness of the diameter of the individual wires comprising the mesh.

Figures 3, 4, 6, 7:
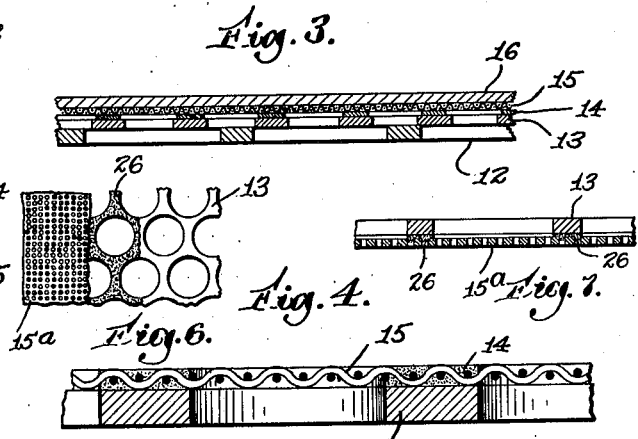
Fig. 3 is a detail sectional view on an enlarged scale of the assemblage shown in Fig. 2.
Fig. 4 is an enlarged scale section of the composite filter or sieve element.
Fig. 6 and Fig. 7 show, respectively, details in plan view and in cross section of a composite filter sieve, the filter member of which comprises a thin, finely perforated metallic sheet integrally united to a relatively heavier, coarsely perforated backing sheet in accordance with the process above described, the scale being much exaggerated.
Figure 5:
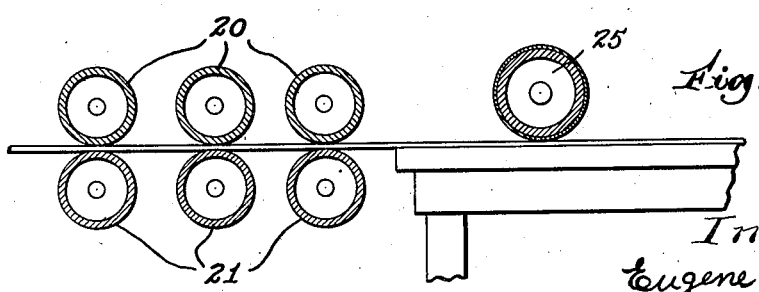
Fig. 5 illustrates in sectional elevation a combination of leveling and buffing rolls.

When making the sieve element of finely perforated thin sheet metal, as shown in Figs. 6 and 7, the same levelling of the finely perforated sheet 25 and of the coarsely perforated backing sheet 13 is employed to secure intimate face to face contact between the two sheets or layers. The uniting film 26 of solder or tin is of substantially less thickness than would be used in the case of a sheet of wire gauze of equal thickness and the method of dipping the backing sheet is therefore preferred when producing this form of the composite screen. Usually the finely perforated filter sheet, after being united to its backing sheet, will be subjected to the same levelling and polishing that is employed as above described in the case of the wire gauze filter element.

What I claim is:

1. The process of producing a fine foraminous self-sustaining filter element which consists in pressing together in a chamber maintained at a solder-fusing temperature a relatively stiff, coarsely perforated backing sheet whose interforaminal area is covered with a film of soldering material, and a relatively limp fine foraminous filter sheet, thereby integrally uniting the two sheets throughout the interforaminal area of the backing sheet covered by the filter sheet.

2. A self-sustaining composite filtering element adapted for insertion in a centrifugal basket comprising a relatively stiff coarsely perforated backing sheet and a relatively limp fine foraminous filter sheet integrally united to the backing sheet throughout the interforaminal area covered by said filter sheet by means of an intervening film of low fusing soldering material forming a protective and anchoring matrix penetrating the interstices of the filtering layer subtending said interforaminal area.

3. A self-sustaining composite filtering element comprising a relatively stiff coarsely foraminous backing sheet and a relatively limp fine foraminous filter layer of wire gauze integrally united to the backing sheet throughout the interforaminal area of the backing, covered by said filter sheet, by means of an intervening film of fused soldering material forming an anchoring matrix penetrating the interstices of the gauze subtending said interforaminal area.

4. A self-sustaining composite filtering element comprising a relatively stiff coarsely foraminous backing sheet and a relatively limp finely perforated filter sheet integrally united to said backing throughout the interforaminal area of the backing, covered by said filter sheet, by means of an intervening film of fused soldering material forming an anchoring matrix penetrating the interstices of the filtering sheet subtending said interforaminal area.

EUGENE ROBERTS.